Nov. 21, 1967  D. M. DANKO  3,354,298
ELECTRONIC FUNCTION GENERATOR
Filed Feb. 26, 1964  3 Sheets-Sheet 1

INVENTOR
DONALD M. DANKO

BY *Richard MacCutcheon*
ATTORNEY

United States Patent Office 3,354,298
Patented Nov. 21, 1967

3,354,298
ELECTRONIC FUNCTION GENERATOR
Donald M. Danko, Parma, Ohio, assignor to Avtron Manufacturing, Inc., Cleveland, Ohio, a corporation of Ohio
Filed Feb. 26, 1964, Ser. No. 347,504
5 Claims. (Cl. 235—197)

This invention relates to computers and more particularly to a function generator for use in connection with other computer apparatus.

The prior art is replete with patents and technical magazine articles showing that any curve may be approximated by a series of straight lines, each not correct in more than one or two spots. But with function generators heretofore, whether dependent upon such plurality of straight lines or whether generating a truly exponential function, the mechanical or electronic apparatus has been very expensive to provide because of the many components required, and, of course, maintenance problems vary directly with the first cost of the equipment.

It is an object of the present invention to provide simple and inexpensive means for overcoming the above mentioned difficulties.

Another object is to provide apparatus which can more closely approximate a desired function than apparatus heretofore known, whereby to provide greater accuracy in readout.

Other objects and advantages will become apparent and the invention may be better understood from consideration of the following description taken in connection with the accompanying drawing in which.

By way of example, in illustrating one use of the present invention, it is assumed incorporated with other apparatus as an electronic type computer capable of relating distance which would have been traveled by a missile in free flight as a function of time required by the missile to travel a shorter distance between two observable points, for example below a cloud layer, or in an indoor baseball, football, or gunnery practice range.

Heretofore the method of computing projected distance of a missile by measuring average velocity thereof over a shorter path has involved either following an exponential curve or else a plurality of straight lines of variant slope, but in either event it can readily be proved that the output of the computer cannot accurately reflect the actual distance which would have been traveled by each of a plurality of projectiles starting off with variant initial velocities.

According to the present invention computation is accomplished by measuring the time required for a missile to travel a predetermined distance, which may be assumed arbitrarily chosen to be 17 feet. Time interval is measured from the time of start of travel to the time a signal is picked up 17 feet away.

To calculate distance if the initial velocity were known, a function generator would only have to generate a pure exponential function but because initial velocity cannot be measured, and the measured velocity is an average, for a distance of 17 feet, computational compensation must be introduced. For the illustrated arrangement such compensation is introduced 250 milliseconds after the "start."

Figure 1:
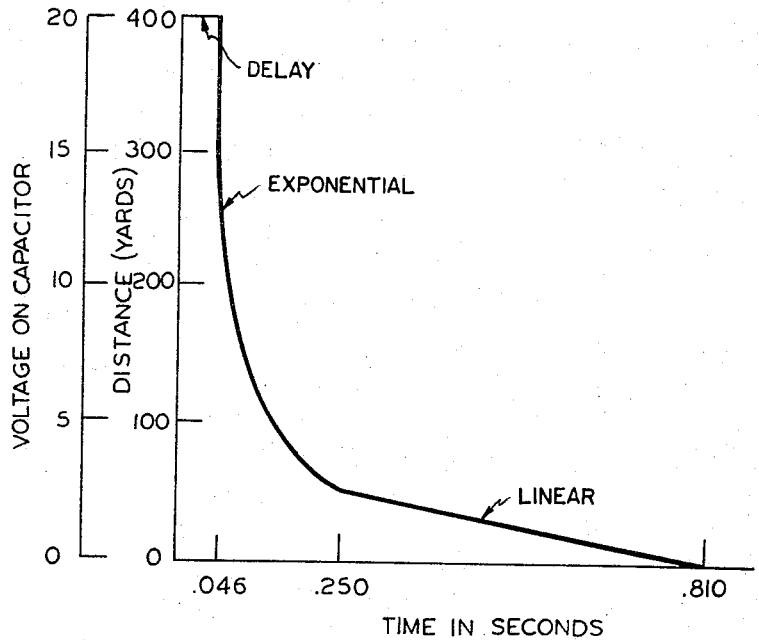
FIG. 1 is a graphical illustration of the action of a function generator in a computer according to the illustrated embodiment of the present invention.

The computer of the present invention comprises an analog function generator which in effect generates three distinct curves shapes. Although any greater number could be used, three curves are preferred because the summation of these curves closely approximates the desired function with a minimum number of components. As illustrated in FIG. 1 the plot contains a 46 ms. delay (curve line D), an exponential portion from 46 ms. to 250 ms. (curve E), and a linear portion from 250 ms. to 810 ms. (curve line L). It will be noted that 810 ms. corresponds to zero distance (because it is assumed that if a stop signal is never received the missile is not going to reach any place of interest).

In the illustrated embodiment a scale factor of 20 yards per volt (of capacitor charge as hereafter explained) is used.

Figure 2:
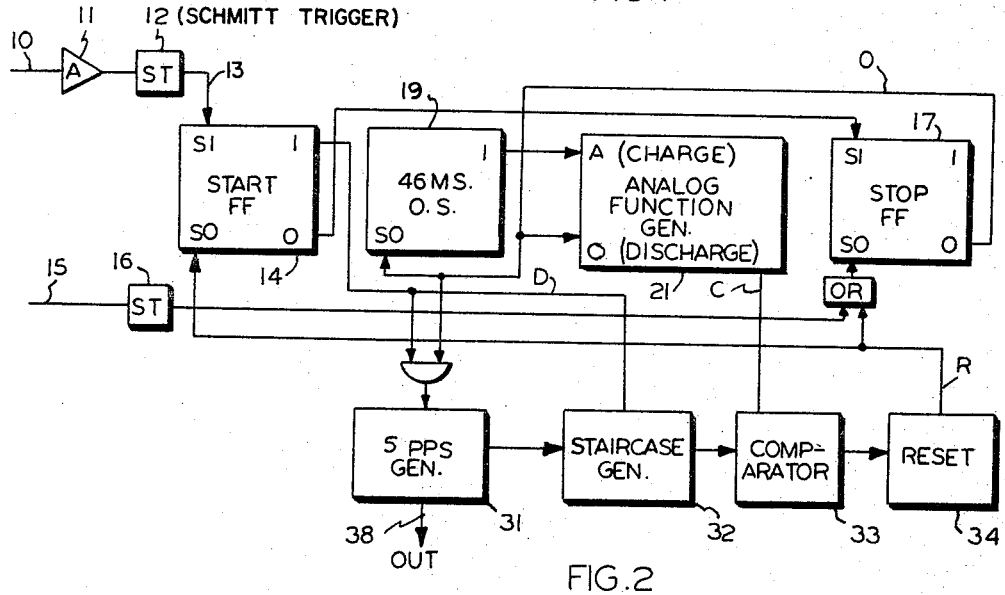
FIG. 2 is a block diagram of a general setup of a system using the embodiments which are detailed in FIGS. 3 and 4.

Referring to FIG. 2, the event of start is assumed detected by a pickup means (not shown but which, of course, might take the form of a spring loaded switch, a photocell, a microphone, or other well known devices) responsive to the event. This, from a connection 10, feeds through an amplifier 11 and then through a "Schmitt" trigger 12, useful if the signal is not otherwise of proper shape to actuate the remaining apparatus. Next, through a line 13, a start signal is applied to a "Start Flip-Flop" (a bistable multivibrator) 14.

When the missile has traveled the 17 feet assumed used for measurement, this, another "event," is assumed detected by a second pickup means (not shown, since such devices are well known and form no part of the present invention). The second event pickup is assumed to feed a connection 15 and through a "Schmitt" trigger 16, to provide a "stop" signal which is applied to a Stop Flip-Flop 17 to terminate one function of the computer.

Initially, before the event of "start," the "1" output of the Start Flip-Flop 14 and the "1" output of the Stop Flip-Flop 17 are in the conducting state. Upon the receipt of an initiating pulse (from line 13), the Start Flip-Flop undergoes a transition where the "1" output goes to the non-conducting state; and the "0" output goes to the conducting state. A transition from the non-conducting to conducting state of the "0" output of the Start Flip-Flop sets "one" in the Stop Flip-Flop similarly changing its initial state. The change of state of the "0" side of Stop Flip-Flop 17, through a connection marked "0," initiates a 46 ms. "One Shot" timing generator indicated generally at 19, more fully disclosed in FIG. 3.

During the time the 46 ms. one shot is activated, a direct coupled transistor 20 gate (see FIG. 4) in an analog function generator assembly 21 causes a memory capacitor 22 to charge to approximately 20 volts and to hold this charge until the 46 ms. generator has charged its own capacitor (19C in FIG. 3) and thus released itself.

Figure 4:
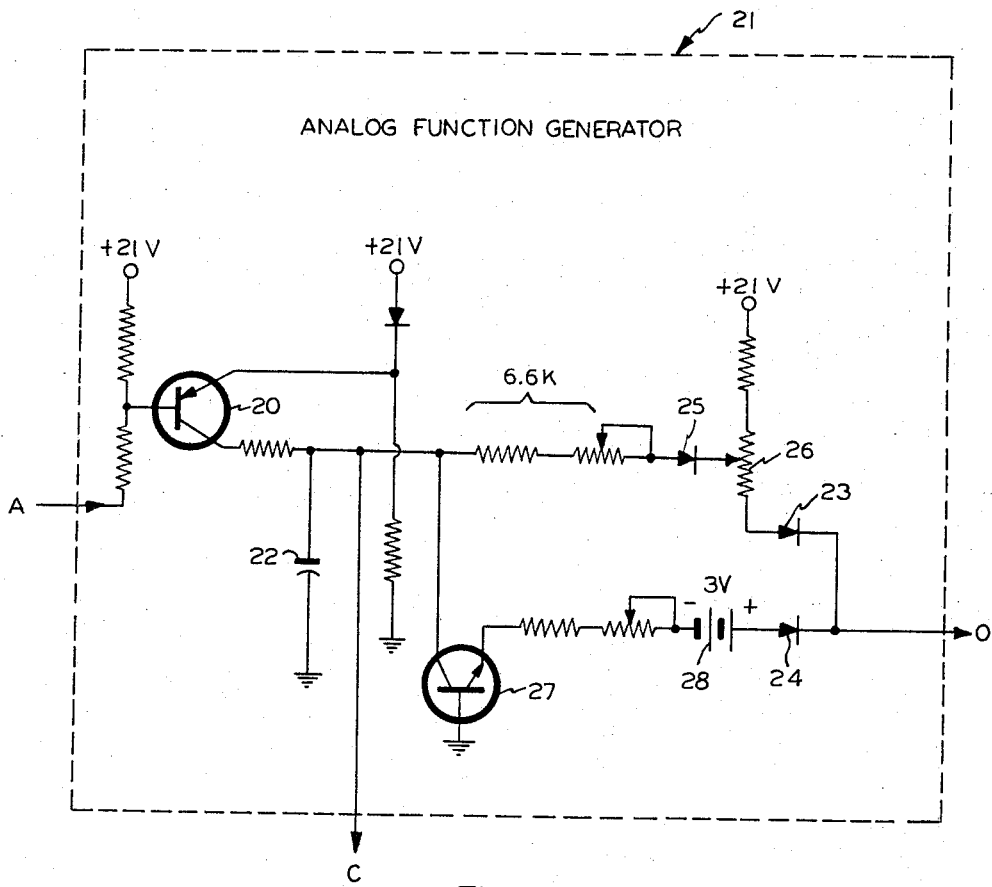
FIG. 4 is a detail of a function generator according to one aspect of the invention and useful with circuitry as shown in FIG. 3.

Concurrent with the change of state of Stop Flip-Flop 17 with the event of "Start," two discharge gates, see rectifiers 23 and 24 in FIG. 4, are closed thereby permitting the memory capacitor 22 to discharge via both of these gates after the 46 ms. have elapsed. A 6.6K resistance and disconnect diode 25 tapped to a voltage divider 26 forms one discharge path, and a transistor 27 constant current drain circuit including a regulated 3 v. source or battery 28, as shown, forms a constant current (linear) discharge path.

In the event a stop signal activates the Stop Flip-Flop 17 and causes it to return to its initial state the two discharge circuits are disconnected, causing the capacitor to stop discharging and to retain a charge which is proportional to the computed distance which the missile will travel or would have traveled if not arrested.

Figure 3:
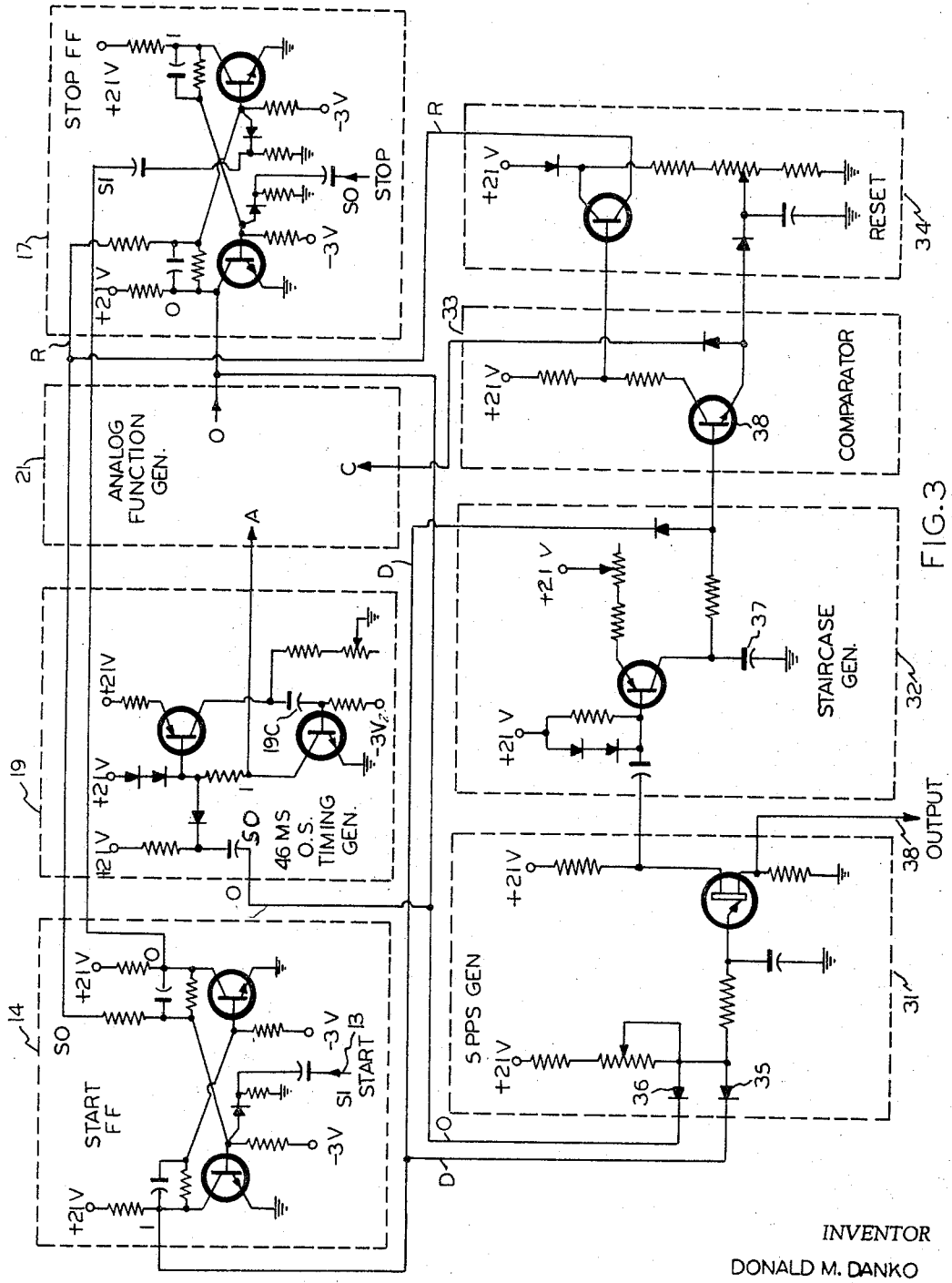
FIG. 3 is a schematic diagram of a computer system incorporating the invention.

Like parts are like numbered in FIG. 3 as in FIG. 2 and 4. All of the individual subcircuits (shown in the dashed blocks at 14, 17, 19, 31, 32, 33 and 34) are or can be standard circuits, and therefore need not be fully described. For providing a digital output (and reset) they include a 5 pulse per second generator 31, a staircase generator 32, a comparator circuit 33, and a reset amplifier 34.

Pulse generator 31 has enabling gates shown in FIG. 3 as diodes 35, 36, respectively, so that when START FF point 1, and STOP FF point 0 are in appropriate state, the "one" side of the Start Flip-Flop and the "zero" side of the Stop Flip-Flop no longer short circuit the 5 p.p.s. generator input and thus coact in an "and" gate to start the 5 p.p.s. generator 31.

32 and 33 could be eliminated, although such an arrangement is not preferred.

During operation, the FIG. 4 memory capacitor 22 is initialy charged, e.g., to 20 volts corresponding to 400 yards, when an initiating signal is applied through signal line 13 (FIGS. 2, 3). The voltage across capacitor 22 remains at 20 volts for 46 ms. (FIG. 1), then it proceeds to discharge exponentially via simultaneous discharge through both discharge circuits. Later the top circuit becomes ineffective because of the stand-off voltage provided at the top of voltage divider 26 (FIG. 4), when, as shown in FIG. 1, 250 ms. has elapsed, and then, through transistor 27 collector and base (coacting with battery 28, and diode 24) the capacitor discharges linearly to zero, unless a stop signal is received in the interim.

There may thus be tabulated a sequence of events as shown in the following table of events:

TABLE OF EVENTS

| Item | Warm Up | Start | 46 ms. After Start | 120 ms. After Start | 250 ms. After Start | 300 ms. After Start | 0.8 Sec. After "Stop" |
|---|---|---|---|---|---|---|---|
| | A. Assuming "Stop" Signal Received 300 ms. After "Start" | | | | | | |
| Start FF 1 | Cond | None | None | None | None | None | Cond. |
| Start FF 0 | None | Cond | Cond | Cond | Cond | Cond | None. |
| Stop FF 1 | Cond | None | None | None | None | None | Cond. |
| Stop FF 0 | None | Cond | Cond | Cond | Cond | Cond | None. |
| 46 MS Genr | None | Cond | None | None | None | None | None. |
| Char e (A) | None | Cond | None | None | None | None | None. |
| Capacitor 22 | 0 v | 0 v | 20 v | 9 v | 2.5 v | 2.3 v | 2.3 v. |
| Discharge (O) | None | None | Cond | Cond | Cond | None | None. |
| Discharge Diode 25 | None | None | Cond | Cond | None | None | None. |
| Discharge Diode 24 | None | None | Cond | Cond | Cond | Cond | None. |
| 5 PPS Gen | None | None | None | None | None | Cond | None. |
| Staircase Gen | None | None | None | None | None | Cond | None. |
| Capacitor 37 | 0 v | 0 v | 0 v | 0 v | 0 v | | 2.5 v. |
| Comparator | None | None | None | None | None | None | Cond. |
| Reset | None | None | None | None | None | None | Cond. |
| Seconds | 0 | 0 | .046 | .120 | .25 | .3 | 1.1 |
| Curve | 0 | Del | Exp | Exp | Lin | Lin | |
| | B. Assuming Stop Signal Received in Column Indicated | | | | | | |
| Yards | 0 | 0 | 400 | 180 | 50 | 46 | |

Each pulse of the 5 p.p.s. generator 31 gates "on" the staircase generator 32 to cause it to charge a comparison capacitor 37 in, it is assumed, ½ volt increments. Each pulse of generator 31 also provides an output through line 38 which might, for example, drive a one-shot relay driver (not shown) to cause a 50 ms. closure of a relay (not shown) to advance a counter (not shown) to thus provide readout of the digital output.

As the charge of the staircase capacitor 37 progressively increases in 0.5 volt increments at the rate of 5 steps per second, comparison of voltage is made by a transistor 38 in the comparator 33. When the voltage on comparison capacitor 37 equals or exceeds that on memory capacitor 22 (FIG. 4) an output is translated from comparator to the reset 34. The reset amplifier through a reset connection "R" restores the Start Flip-Flop to its initial state (and would restore Stop Flip-Flop also if for any reason it were not already back to its initial state). This, through connection D, causes disabling of the 5 p.p.s. generator 31 and causes through connection D discharge of the staircase comparison capacitor 37 to approximately zero volts. An added refinement (not shown) might be a one-second pulse generator, for furnishing a pulse to the reset amplifier in case no stop signal was ever received within one second, for the purpose of alternatively restoring the entire computer to its original state.

As described in connection with the present case drawing a comparison "C" voltage is used to stop the 5 p.p.s. pulse generator thus to provide a digital readout although the same line C could be used to derive an analog output in which case the equipment of blocks 31, There is thus provided a device of the character described capable of meeting the objects of the present invention, resulting in minimal complexity of apparatus, and maximal accuracy in approximating a desired function.

While I has illustrated and described a particular embodiment, various modifications may obviously be made without departing from the true spirit and scope of the invention which I intend to have defined only by the accompanying claims taken with all reasonable equivalents.

I claim:

1. An analog function generator and computer circuit for generating a signal and for use with a first pickup means responsive to an event and a second pickup means responsive to another event, said circuit comprising
   a relatively constant voltage D.C supply,
   a start circuit including an electronic device connected responsive to energization from said first pickup means and connected to gate the D.C. supply from a non-conductive to a conductive sense,
   a time delay means connected to said start circuit and for gating said D.C. supply when the start circuit becomes conductive and for a predetermined time interval thereafter,
   a function generator having a capacitor and having
      a charging circuit means connected to said time delay means and for charging said capacitor to a predetermined value when the time delay means becomes conductive and for holding the charge so long as the time delay means is conductive, a discharge circuit means connected to said time delay means and for discharging said capacitor as a function of time after the time interval of the time delay means has elapsed, and a stop circuit means including an electronic device connected to the second pickup means and for rendering the function generator discharge circuit means non-conductive whereby to hold the charge on the function generator capacitor in memory for deriving a useful output therefrom.

2. An analog function generator and computer circuit as in claim 1 further characterized by the function generator discharge circuit means comprising a first discharge circuit for discharging the capacitor linearly with respect to time, a second discharge circuit for cooperating with the first discharge circuit to discharge the capacitor exponentially with respect to time until a predetermined time is reached after which the capacitor discharges linearly through the first discharge circuit alone.

3. In a computer circuit for use with a supply of D.C. voltage, start means for indicating the desirability of applying said voltage, gate means connected to the start means and for serving as a conducting gate for said D.C. voltage when triggered by the start means, a memory capacitor connected to said gate means and thus charged by said D.C. voltage as gated by said gate means, means connected in circuit with said memory capacitor and for partially discharging said memory capacitor exponentially for a predetermined period of time, means connected in circuit with said memory capacitor and for further discharging said memory capacitor linearly for an additional predetermined period of time, stop means connected to the last two mentioned means and for stopping memory capacitor discharge at any time during either of said predetermined periods of time, and output means including a connection to the memory capacitor and for deriving a useful comparison from said capacitor.

4. In a computer circuit the combination of claim 3 further characterized by a pulse means connected to the stop means and for providing a digital output, a staircase generator means connected to the output of the pulse means and for generating a successively higher voltage as a function of time, comparator means connected to the memory capacitor and to the staircase generator means and for comparing the voltage attained by the staircase generator with that held in memory by the memory capacitor, and reset means connected to the comparator and for resetting at least the gate means, the memory capacitor, and the staircase generator when said reset means is energized by said comparator.

5. In a computer circuit for use with a D.C. signal the combination of a memory means comprising a first capacitor, means including a first gating circuit for charging said first capacitor from said D.C. signal, means including second and third gating circuits for discharging said first capacitor, means including a fourth gating circuit for arresting the discharge of said memory capacitor, a pulse generator means connected to the fourth gating circuit and for providing a digital output when called for by the fourth gating circuit, a ramp generator connected to the output of said pulse generator means, a second capacitor connected to be progressively charged by said ramp generator, a comparator circuit connected to and for comparing the voltages on the first and second capacitors, and a reset means connected to said comparator circuit and for resetting the circuit to original condition responsive to a comparison of the voltages on the two capacitors.

References Cited

UNITED STATES PATENTS 3,128,377 4/1964 Goddard _____ 235—197
3,155,821 11/1964 Shain _____ 235—168

MALCOLM A. MORRISON, *Primary Examiner.*

J. RUGGIERO, *Assistant Examiner.*